United States Patent
Bitauld et al.

(10) Patent No.: US 11,115,205 B2
(45) Date of Patent: Sep. 7, 2021

(54) METHOD AND APPARATUS FOR TRUSTED COMPUTING

(71) Applicant: Nokia Technologies Oy, Espoo (FI)

(72) Inventors: David Bitauld, Cambridge (GB); Troels F. Roennow, Cambridge (GB); Enrique Martin Lopez, Cambridge (GB); Philip Gordon Derrick, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 234 days.

(21) Appl. No.: 16/337,574

(22) PCT Filed: Sep. 29, 2016

(86) PCT No.: PCT/CN2016/100840
§ 371 (c)(1),
(2) Date: Mar. 28, 2019

(87) PCT Pub. No.: WO2018/058441
PCT Pub. Date: Apr. 5, 2018

(65) Prior Publication Data
US 2020/0036519 A1    Jan. 30, 2020

(51) Int. Cl.
*H04L 9/08* (2006.01)
*G06F 21/57* (2013.01)
(Continued)

(52) U.S. Cl.
CPC .............. *H04L 9/088* (2013.01); *G06F 21/57* (2013.01); *H04L 9/0643* (2013.01); *H04L 9/30* (2013.01)

(58) Field of Classification Search
CPC ......... H04L 9/088; H04L 9/0643; H04L 9/30; G06F 21/57
See application file for complete search history.

(56) References Cited

U.S. PATENT DOCUMENTS

| 2015/0381658 A1 | 12/2015 | Poornachandran et al. |
| 2016/0036826 A1 | 2/2016 | Pogorelik et al. |

(Continued)

FOREIGN PATENT DOCUMENTS

| CN | 1421000 A | 5/2003 |
| CN | 1574730 A | 2/2005 |

(Continued)

OTHER PUBLICATIONS

International Search Report for PCT/CN2016/100840 dated Jun. 30, 2017.

(Continued)

*Primary Examiner* — Hee K Song
(74) *Attorney, Agent, or Firm* — Fay Sharpe LLP (57) ABSTRACT

Apparatus, method, computer program product and computer readable medium are disclosed for trusted computing. A method includes, at an isolated processor including a trusted execution environment and an isolated storage, receiving data encrypted with a first public key; decrypting the encrypted data with a first private key; performing calculation on the decrypted data by using an approved program; and providing the calculation result, wherein the approved program is authorized by a smart contract, a unique identifier of the smart contract is stored in the isolated processor, both the approved program and the isolated processor are verified by at least one participant of the smart contract, and the first public key and the first private key are generated by the isolated processor.

20 Claims, 2 Drawing Sheets

(51) Int. Cl.
*H04L 9/06* (2006.01)
*H04L 9/30* (2006.01)

(56) References Cited

U.S. PATENT DOCUMENTS

2018/0041345 A1 2/2018 Maim
2018/0089638 A1* 3/2018 Christidis .......... G06Q 10/0639

FOREIGN PATENT DOCUMENTS

CN         105912272  A    8/2016
WO    WO 2015/042548 A1   3/2015
WO    WO 2016/120826 A2   8/2016
WO     WO-2018058441 A1 *  4/2018  ........... H04L 9/0897

OTHER PUBLICATIONS

Search report of related Chinese Application Serial No. 2016800896581 dated Jun. 10, 2021, 1 page.

* cited by examiner

METHOD AND APPARATUS FOR TRUSTED COMPUTING

FIELD OF THE INVENTION

The present disclosure generally relates to information technology. More specifically, the present disclosure relates to method and apparatus for trusted computing.

BACKGROUND

The fast growth of information technology has dramatically changed people's daily life. More and more data may be generated or owned by users which may be critical to the success of various services such as Digital Health (DH) or marketing. For example, DH progress may be based on the insights extracted/mined from the data. However many users may be reluctant to provide these data due to lack of trust or privacy protection. As an example, phenomenal advances in medical sciences and preventive health could be expected if people shared information about their health. However, this may include sensitive information they are not ready to disclose with any other person or organization. Most likely, people may only allow companies and research organizations to use their data if they are certain their personal information will remain secret. Unfortunately it is difficult to trust the organization that physically hosts the hardware and software for processing the data.

Homomorphic encryption may provide the trusted computing. Homomorphic encryption is a form of encryption that allows computations to be carried out on ciphertext, thus generating an encrypted result which, when decrypted, matches the result of operations performed on the plaintext. However, this technology is still in its infancy and it is only applicable to specific types of research problems at the moment.

Thus, it would be an advancement to provide method and apparatus for trusted computing.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

According to first aspect of the disclosure, it is provided a method. the method comprises: at an isolated processor comprising a trusted execution environment and an isolated storage, receiving data encrypted with a first public key; decrypting the encrypted data with a first private key; performing calculation on the decrypted data by using an approved program; and providing the calculation result, wherein the approved program is authorized by a smart contract, a unique identifier of the smart contract is stored in the isolated processor, both the approved program and the isolated processor are verified by at least one participant of the smart contract, and the first public key and the first private key are generated by the isolated processor.

According to second aspect of the disclosure, it is provided an isolated processor. isolated processor comprising: a trusted execution environment and an isolated storage including computer program code, the isolated storage and the computer program code configured to, with the trusted execution environment, cause the isolated processor to perform: receive data encrypted with a first public key; decrypt the encrypted data with a first private key; perform calculation on the decrypted data by using an approved program; and provide the calculation result, wherein the approved program is authorized by a smart contract, a unique identifier of the smart contract is stored in the isolated processor, both the approved program and the isolated processor are verified by at least one participant of the smart contract, and the first public key and the first private key are generated by the isolated processor.

According to third aspect of the disclosure, it is provided computer-readable storage medium carrying one or more sequences of one or more instructions which, when executed by an isolated processor comprising a trusted execution environment and an isolated storage, cause the isolated processor to execute: receive data encrypted with a first public key; decrypt the encrypted data with a first private key; perform calculation on the decrypted data by using an approved program; and provide the calculation result, wherein the approved program is authorized by a smart contract, a unique identifier of the smart contract is stored in the isolated processor, both the approved program and the isolated processor are verified by at least one participant of the smart contract, and the first public key and the first private key are generated by the isolated processor.

According to fourth aspect of the disclosure, it is provided a computer program product comprising one or more sequences of one or more instructions which, when executed by an isolated processor comprising a trusted execution environment and an isolated storage, cause the isolated processor to perform: receive data encrypted with a first public key; decrypt the encrypted data with a first private key; perform calculation on the decrypted data by using an approved program; and provide the calculation result, wherein the approved program is authorized by a smart contract, a unique identifier of the smart contract is stored in the isolated processor, both the approved program and the isolated processor are verified by at least one participant of the smart contract, and the first public key and the first private key are generated by the isolated processor.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement. Various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present disclosure. Thus, use of any such terms should not be taken to limit the spirit and scope of embodiments of the present disclosure.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As used herein, a smart contract is a contract captured in code, which automatically performs the obligations the parties have committed to in the agreement. Smart contracts self-execute the stipulations of an agreement when predetermined conditions are triggered. Smart contract execution usually takes place in a distributed-computing network whose nodes are able to run the code, and therefore, publicly verify its outputs for the corresponding inputs. The participants of the smart contract could for example include customer protection and digital rights associations as well as governments and companies. A smart contract may have a unique identifier which may be stored in an isolated processor according to embodiments of the present invention.

As used herein, an alliance is defined as the participant(s) of the smart contract. The alliance may include one or more participants. The code/program validated by the alliance through the smart contract may run on the isolated processor according to embodiments of the present invention. In addition, the alliance may further validate the isolated processor and the code/program according to embodiments of the present invention.

A purpose of embodiments of the present disclosure is to build trust between untrusting partners of an alliance as well as building trust of individual users in this alliance. This is done by ensuring that an isolated processor verified by the alliance will only execute a program/code authorized by a publicly verifiable smart contract.

While the following embodiments are primarily discussed in the context of privacy preserving computation, it will be recognized by those of ordinary skill that the disclosure is not so limited. In fact, the various aspects of this disclosure are useful in any trusted computing that can benefit from embodiments as described herein.

Figure 1:
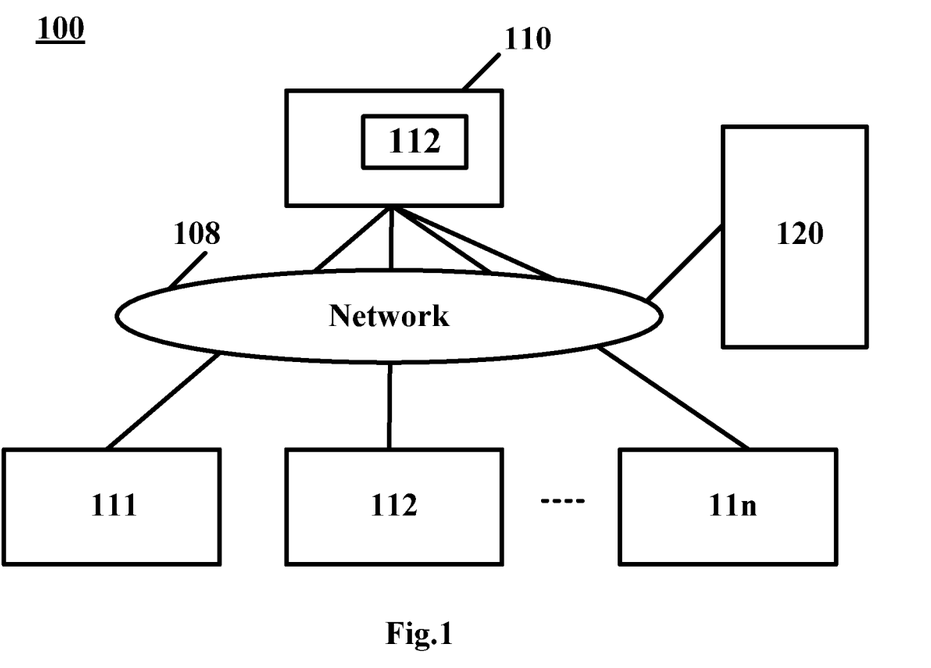
FIG. 1 depicts a schematic system, in which some embodiments of the present disclosure can be implemented.

FIG. 1 depicts a schematic system, in which some embodiments of the present disclosure can be implemented. As shown in FIG. 1, the system 100 may comprise one or more electronic apparatuses 111-11$n$ each operably connected to a server 110 through a network 108. It should be understood, however, that the electronic apparatus as illustrated and hereinafter described is merely illustrative of an apparatus that could benefit from embodiments of the disclosure and, therefore, should not be taken to limit the scope of the disclosure. While the electronic apparatus 111 is illustrated and will be hereinafter described for purposes of example, other types of apparatuses may readily employ embodiments of the disclosure. The electronic apparatus 111 may be a portable digital assistant (PDAs), a user equipment, a mobile computer, a desktop computer, a smart television, a gaming apparatus, a laptop computer, a media player, a camera, a video recorder, a mobile phone, a global positioning system (GPS) apparatus, a smart phone, a tablet, a server, a thin client, a cloud computer, a virtual server, a set-top box, a computing device, a distributed system, a smart glass, a vehicle navigation system and/or any other types of electronic systems. The electronic apparatus 111 may run with any kind of operating system including, but not limited to, Windows, Linux, UNIX, Android, iOS and their variants. Moreover, the apparatus of at least one example embodiment need not to be the entire electronic apparatus, but may be a component or group of components of the electronic apparatus in other example embodiments.

Additionally, the electronic apparatuses 111-11$n$ may transmit data such as sensitive data or other data to the server 110. Although not shown in FIG. 1, there can be one or more servers 110 operably connected to the electronic apparatuses 111-11$n$ and configured to receive data from them.

The system 100 may also comprise the server 110. The server 110 may comprise an isolated processor 112 which is configured to perform functions related to data processing/computing. In an embodiment, the isolated processor 112 can implement privacy preserving computation. Alternatively the isolated processor 112 can also perform additional functions. In some embodiments where there are multiple data processing/computation tasks going on, the isolated processor 112 can also be used for those tasks. The isolated processor 112 can be implemented in form of hardware comprised in server 110. The server 110 may comprise cloud computers, smart phones, tablets, laptops, servers and PCs. The server 110 may run with any kind of operating system including, but not limited to, Windows, Linux, UNIX, Android, iOS and their variants. In addition, there can be one or more servers 110 to perform functionality corporately.

The server 110 may comprise one or more isolated processors 112. An example of this type of processor is the ARM TrustZone with a trusted environment. The Open Mobile Terminal Platform (OMTP) TR1 document defines the trusted environment in the context of mobile equipment as follows:

"Trusted Execution Environment (TEE): an Execution Environment with security capabilities and meeting certain security-related requirements; an Execution Environment that makes certain programs executed as written, resisting a set of defined Threats.

Secure Storage: is a facility that aids Trusted Execution Environment handling of Sensitive Objects, storing them as long as is required, in such a way that it maintains their security properties when resisting a set of defined Threats.

Flexible Secure Boot: implements the process that ensures the Integrity of the ME code base at boot time with the possibility of modifying the code base via an update code base image which is obtained via an over-the-air download or via some other connection.

Generic Bootstrapping Architecture (GBA): defines a secure GBA method for using the existing security relationship between the mobile network operator and the (U) SIM (Universal Subscriber Identity Module) of the user for other Applications within the ME. This function is primarily used for establishment of security on the 3GPP (the 3rd Generation Partnership Project) or GSM (Global System for Mobile Communications) bearer layer.

Run-Time Integrity Checking: determines and maintains the Integrity of principal hardware and software components within the ME (Mobile Equipment). Run-time monitoring and detection of unauthorized changes of state provides reaction capabilities against a defined set of Threats.

Secure Access to User Input/Output Facility: assures secure interaction with the user, guaranteeing the secure and trusted user input and output from the Trusted Execution Environment and defending information against a defined set of Threats.

Secure Interaction of UICC (Universal Integrated Circuit Card) with Mobile Equipment: assures secure communications and interaction between the UICC and the ME, allowing the UICC to ratify the trustworthiness of the ME and securely access ME facilities. It establishes a Secure Channel between TEE and UICC Applications."

Implementation of such processor could be done by establishing a secure "root of trust" as follows. A secure first stage bootloader is stored in ROM (read only memory) on the SoC (system on a chip). The code in this ROM is guaranteed to be uncompromised as it is part of the manufacturing stage, either defined by the mask patterns for the physical ROM or the ROM could be a one-time programmable (OTP) memory programmed before release to the field. Further programming once in the field must be impossible (or impossible without secure authentication). The processor comes up in secure mode and starts executing the first stage bootloader from the Boot ROM. This loads in a second stage bootloader program and verifies the digital signature of this second stage prior to executing the code in this second stage bootloader. This second stage bootloader includes code that bring the processor out of secure mode into an unsecure mode for user written programs; access to secure regions are no longer allowed in this mode. Alternatively the demotion of a secure mode to an unsecure mode can be performed by the first stage bootloader. This can be more secure but does not allow for any change post manufacture and is very expensive to change in the case of ROM masks. The digital signature verification is through tried and trusted means. For example, the public key is stored where it cannot be modified (e.g. secure memory, possible One Time Programmable (OTP). The sender sends a digitally signed copy of the program (data) (typically this would be done by attaching a signature by generating a hash of the data and encrypting the hash with the signer's private key). The secure code extracts the signature and decrypts with the public key, comparing this to an internally generated hash of the program (data). These hash values are compared. If they are the same, control is passed to the secondary bootloader. The same thing happens if any additional bootloaders are needed. All secure code gets loaded in this way and then the processor drops out of secure mode. It is these non-secure modes where application software can be run.

It is noted that the above type of processor can also be adapted for the server 110. Moreover, the isolated processors 112 can be implemented by using any other suitable existing or future technologies in addition to the ARM TrustZone. In an embodiment, the isolated processors 112 may store a unique identifier of the smart contract and run the code/program authorized by the smart contract. In an embodiment, the isolated processor 112 may be identified by a second public key used for digital signature and a second private key associated with the second public key may be stored in the isolated processor. For example, the isolated processor 112 may generate a second public-private key pair and share the second public key publicly. In addition, the second public key can also be used to encrypt communication to the isolated processor 112.

In an embodiment, the isolated processor 112 may store a unique identifier of the smart contract and only execute the code/program authorized by the smart contract. For example, the participants of the smart contract may agree on the program to be run on the isolated processor 112, wherein the program may be referred as to approved program herein. In addition, both the approved program and the isolated processor 112 may be verified by at least one participant of the smart contract.

The system may further comprise a smart contract generation platform 120 such as blockchain platform. The smart contract generation platform 120 may generate the smart contract agreed with an alliance of companies, customer protection association, governments etc. The smart contract generation platform 120 enables unique identification of a smart contract with an identifier, which may be "engraved" in the isolated processor 112. The smart contract may contain or indicate the code/program to be run on the isolated processor 112 and the isolated processor 112 may only execute the code/program authorized by the smart contract.

In an embodiment, the smart contract contains the second public key used to identify the isolated processor 112, location information of the program approved/authorized by the smart contract and a hash value of the approved program or the approved program and the second public key. In an embodiment, the hash value can be used to authenticate the approved program by the isolated processor 112. In addition, the hash value of the approved program and the second public key can make sure the approved program and the isolated processor 112 are "dedicated" to each other, which can further enhance security. Moreover the hash value is generally made public.

The smart contract generation platform 120 can generate the smart contract in any suitable way. In an embodiment, the participants of the smart contract may make a contract, and then the contract is coded into the smart contract and stored in the smart contract generation platform 120 for example.

In another embodiment, the smart contract generation platform 120 may be a blockchain platform such as Ethereum. The blockchain platform is a decentralized platform that runs smart contracts: applications that run exactly as programmed without any possibility of downtime, censorship, fraud or third party interference. Once two or more parties consent to all of the terms within the contract, they cryptographically sign the smart contract and deploy it to a distributed ledger. When a condition specified in the code is met, the program automatically triggers a corresponding action.

In one embodiment of the present disclosure, the participants of the smart contract may form an alliance and record types including at least one of the alliance record, the alliance member record, the isolated processor record and the approved program record, are stored onto the blockchain platform's distributed ledger and are queried and managed by the smart contract. The alliance record may keep track of available alliances whereas the alliance member record may contain the set of participants associated with each alliance. In one embodiment of the present disclosure, these two records are non-changeable and may be included directly into the consensus of the underlying blockchain. In another embodiment, the alliance record is non-changeable, but its member list may be modified by majority voting of the alliance members. In this embodiment, an initial set of members may be coded into the genesis block. In a third embodiment, both alliances and members are changeable. In this embodiment, new alliances may be formed by approval of a public authority such as the European Union or the US government. Depending on the implementation the participating members may be changeable by majority voting or alternatively by authority approval.

Once an alliance is formed, the ledger and the corresponding secure hardware may operate as follows:

A set of alliance participants may add new hardware (i.e., the isolated processor 112) to perform trusted computations. This process can happen in accordance with many different variations. In the first variation, a single hardware approving authority is part of the alliance and approves new hardware by signing a transaction containing the hardware owner and the hardware's public id (such as the second public key). In this process the authority may require that the alliance id which could be synonymous to the unique identifier of the smart contract is engraved into the hardware. In another version, participants of the alliance approve each other's hardware.

Network participants (not necessarily members of the alliance), may suggest programs to run on the hardware. Upon suggesting a program, a notification is sent to the alliance members which can then examine and approve the program. The approval is done by signing a transaction which creates an entry on the program record of the ledger. Said entry may contain a hash of the approved program. In one embodiment, the approval transaction may be signed by a single member. In another embodiment, it may require the majority or all of the members to approve. In a third embodiment, the approval may be done by special alliance members such as government related alliance members. In the preferred embodiment of the present disclosure, the alliance participants agree that this computation is such that it preserves the anonymity of the users providing the input data.

The program record may contain a hash of the program, an alliance id and a pointer to where the program is stored, or even the program itself.

It is noted that the smart contract generation platform 120 is shown as one entity, but in some embodiment it may be a decentralized platform such as Ethereum which may be distributed in a plurality of apparatuses such as the server 110, the electronic apparatuses 111-11n and/or any other suitable apparatuses.

Turn to FIG. 1, the network 108 may comprise any kind of network or multiple networks operably connected. Examples of the network 108 may include any wired or wireless network or their combination, including, but not limited to, a wireless cellular telephone network (such as the global system for mobile communications (GSM) network, 3rd generation (3G) network, 3.5th generation (3.5G) network, 4th generation (4G) network, universal mobile telecommunications system (UMTS), code division multiple access (CDMA) network etc), a wireless local area network (WLAN) such as defined by any of the Institute of Electrical and Electronic Engineers (IEEE) 802.x standards, an Ethernet local area network, a token ring local area network, a wide area network, and the Internet.

In addition, the communication between the any two elements of system 100 may be encrypted. For example, the isolated processor 112 may send its signature with its first public key to at least one of the electronic apparatuses 111-11n, the blockchain platform 120 and another isolated processor, wherein the signature may be based on an identifying key pair used for identifying the isolated processor, such as the second public key. The electronic apparatuses 111-11n can use the first public key to encrypt its data and send them to the isolated processor 112. It is noted that the second public key can also be used to encrypt communication to the isolated processor 112 as mentioned above. In this case the first public-private key pair may be same as the second public-private key pair.

Figure 2:
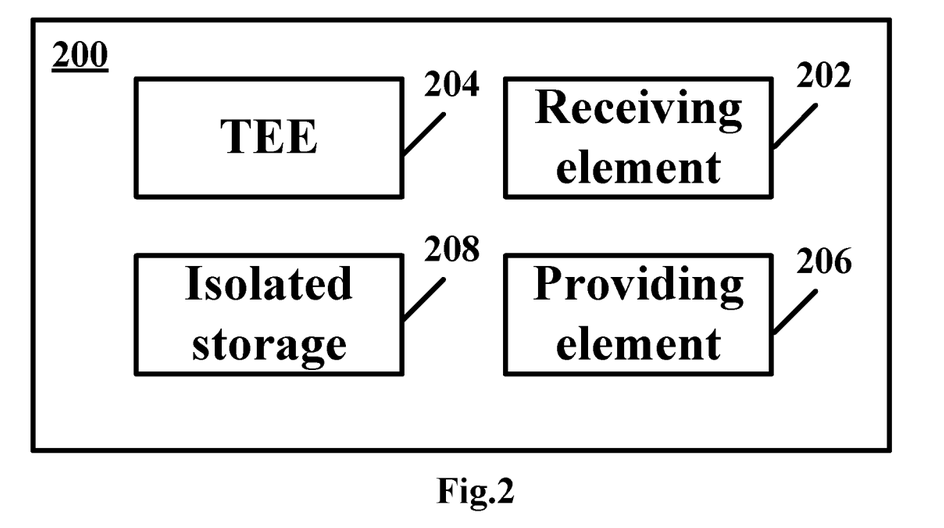
FIG. 2 illustrates a simplified block diagram of the isolated processor which is suitable for using in practicing the exemplary embodiments of the present disclosure.

FIG. 2 illustrates a simplified block diagram of the isolated processor 200 which is suitable for using in practicing the exemplary embodiments of the present disclosure. In FIG. 2, the isolated processor 200 may comprise a receiving element 202 configured to receive data encrypted with the first public key. For example the receiving element 202 may receive data encrypted with the first public key from at least one of an electronic apparatus 111, another isolated processor and other suitable apparatus. The isolated processor 200 may produce the first public-private key pair used for data encryption/decryption and share the first public key with at least one of an electronic apparatus 111, another isolated processor 200 and other suitable apparatus.

In an embodiment, the receiving element 202 may receive data encrypted with the first public key from an electronic apparatus 111. For example, an alliance is assembled to be the participants of the smart contract pertaining to the trusted computing such as privacy preserving computation. This alliance may be advertised publicly and a website may be created (or companies' websites are validated by the alliance). Thus, the potential users of these websites may know that the alliance unanimously agrees that their sensitive data will be used while preserving their privacy, e.g. according to differential privacy definitions. The code/program using the data will be running on the isolated processor and possibly made public for any user to check.

The code/program validated by the alliance through the smart contract runs on the isolated processor. The isolated processor may produce a first private-public key pair and shares the first public key through the validated websites, wherein the first public key may be used by users to encrypt their data. This process to upload its data can appear to the user as an https-like connection in a browser or as an app.

Depending on the actual calculations sought, different kinds of data might be required. Each individual user may decide (e.g. in the settings of the website) which data are made available and for how long. Data types could include but not limited to location history, health records, wearable/IOT devices records, health questionnaire, browsing history.

In another embodiment, a plurality of isolated processors 200 may perform distributed computing. In this case, the receiving element 202 may receive data encrypted with the first public key from another isolated processor 200. The received data may be intermediate data or a part of data.

The isolated processor 200 may further comprise a trusted execution environment (TEE) 204. The TEE 204 may be provided with security capabilities and meets certain security-related requirements. An execution environment makes certain programs executed as written and resists a set of defined threats. In an embodiment, the TEE 204 may decrypt the encrypted data with the first private key and perform calculation on the decrypted data by using an approved program, wherein the approved program may be authorized by the smart contract. The calculation can be any suitable calculation for realizing particular purpose. For example, the calculation may be differential privacy computing by which the general characteristics of populations (with application in e.g. health or marketing) can be learned while guaranteeing the privacy of any individual's records. The approved program can implement different functionalities depending on different requirements. For example, if the data providers require that their data should not be stored and used for other purposes that don't respect differential privacy, then the approved program should not store the data and can only use it for differential privacy computation.

For example, as mentioned above, the unique identifier of the smart contract may be stored in the isolated processor. When the isolated processor is switched on, it may connect to internet, locate the smart contract in its hosting blockchain platform (e.g. Ethereum) and execute the approved program authorized by the smart contract. In some implementations the approved program can be authenticated by its hash value. For example, the TEE 204 may generate the hash value of the approved program in a predefined way and compare the generated hash value with the hash value stored in the smart contract or in the isolated processor 200. If they are the same, the program is authenticated.

In an embodiment, both the approved program and the isolated processor are verified by at least one participant of the smart contract. For example, the isolated processor and the approved program may be verified by the hardware verification protocol below.

Hardware Verification Protocol

1) An alliance between mutually untrusting parties is formed.
2) Experts from each participant of the alliance decide on a manufacturer of the isolated processor and checks designs, fabrication processes, quality standards and reputability of manufacturer (e.g. ARM, Intel).
3) Processor with TEE and memory such as isolated memory and optionally a Read Only Memory (ROM) or one time programmable (OTP) memory is fabricated by the approved manufacturer.
4) Processor can be uniquely identified e.g. by generating a second public-private key pair.
5) Experts physically verify the processor identifiable by the second public key. For example, the experts can check that it is the right processor by challenging it. As an example, the processor may generate a private-public key pair. If an expert wants to check that the processor it is communicating with is the right one, it sends this processor a challenge. The processor creates a signature with its private key. The expert checks that the signature is correct by using the public key.
6) The alliance agrees on a program to be run on the processor. In some embodiments the participant may produce a hash of the approved program they authorize. In some embodiments, the hash of the approved program may be "engraved" in the isolated memory, the ROM or the OTP memory of the processor.
7) If all the participants validate both the processor's hardware and the approved program that it will run, then the smart contract can be created and the system 100 can begin to operate. Depending on implementation the smart contract could contain permanently the processor's second public key and/or a hash value of the approved program (e.g. a hash value of its source code) to be executed by the processor. In other implementations the processor and/or the approved program could evolve with agreement from the alliance. Smart contract identifier may be "engraved" in the isolated memory or the OTP memory of the processor. In addition, the hash value may be encrypted with the second public key and stored in the smart contract.
8) When the processor is switched on, it connects to internet, locates the smart contract for example in its hosting blockchain platform (e.g. Ethereum) and executes the program authorized by the smart contract. In some embodiment, the program can be authenticated by its hash.
9) Optionally, the processor would be fabricated, or immutably programmed, to allow the possibility of monitoring but not tampering with the code that it runs.

In an embodiment, the unique identifier of the smart contract may be stored in the isolated processor 200, for example in the isolated memory 208 as shown in FIG. 2. The isolated storage 208 may be a facility that aids trusted execution environment handling of objects such as sensitive objects, storing them as long as is required, in such a way that it maintains their security properties when resisting a set of defined threats. In an embodiment, the isolated storage 208 can store any suitable data such as the decrypted data. In another embodiment where the isolated processor 200 may further comprise the OTP memory (not shown), the unique identifier may be stored in the OTP memory.

The isolated processor 200 may further comprise a providing element 206 configured to provide the calculation result. For example, the providing element 206 may provide the calculation result to researcher (or market analyst) to understand correlations and trends. Then this knowledge can be used to help individual users. In addition, if the calculation is the distributed computing and the calculation result is intermediate calculation result, then the providing element 206 may provide the calculation result to another isolated processor for further processing.

In an embodiment, the isolated processor 200 may be identified by a second public key and a second private key associated with the second public key is stored in the isolated processor. For example, the isolated processor 200 may generate a second private-public key pair and share the second public key for example through the validated websites. The smart contract generation platform 120 such as the blockchain platform may associate the second public key with the smart contract. For example, the smart contract may contain the second public key of the isolated processor 200.

In an embodiment, the smart contract may contain the second public key, location information of the approved program and a hash value of the approved program or the approved program and the second public key. For example, the second public key can be used to encrypt the communication to the isolated processor 200 and/or as the identification of the isolated processor 200. The location information of the approved program can indicate where the approved program is stored. For example, the location information may be a pointer. The hash value can be used by the isolated processor 200 to verify the approved program. In an embodiment, the smart contract generation platform 120 may provide a secure mechanism to ensure that the hash value of the approved program cannot be modified by an unauthorized party.

In an embodiment, the smart contract contains the second public key and location information of the approved program, and a hash value of the approved program or the approved program and the second public key and its mapping relationship with the unique identifier may be stored in the isolated processor. In this way, it can prevent modification of the hash value of the approved program by untrusted party. As mentioned above, the hash value of the approved program and the second public key can make sure the approved program and the isolated processor 112 are "dedicated" to each other, which can further enhance security. Moreover the hash value is generally made public.

In an embodiment, the isolated processor 200 may authenticate the approved program by the hash value. For example, if the hash value is the hash value of the approved program, the isolated processor 200 may calculate the hash value of the approved program. If the hash value is the hash value of the approved program and the second public key, the isolated processor 200 may calculate the hash value of the approved program and the second public key. Then the isolated processor 200 may compare the calculated hash value with the hash value obtained from the smart contract generation platform 120 or stored in the isolated processor 200. If the two are the same, then the approved program is authenticated. In this case, the isolated processor 200 can execute the approved program. Otherwise, it may omitted the approved program or deny to execute the approved program.

In an embodiment, the approved program and at least some contents of the smart contract are made public. For example, the users can check the approved program and at least some contents of the smart contract before they provide data to the isolated processor.

In an embodiment, the unique identifier of the smart contract is produced by a blockchain platform and the isolated processor 200 may further comprise a locating element (not shown in FIG. 2) configured to locate the smart contract in the blockchain platform. For example, the locating element may send a request containing the unique identifier to the blockchain platform to query the smart contract, and the blockchain platform may find the smart contract by using the unique identifier and return the smart contract to the locating element. From the smart contract, the locating element can determine the location of the approved program and the hash value of the approved program (if any).

In an embodiment, the isolated processor 200 may be fabricated, or immutably programmed, to allow the functionality of monitoring but not tampering with the code that it runs.

It is noted that the isolated processor 200 may comprise any other suitable elements/functionalities as defined by the Open Mobile Terminal Platform (OMTP) TR1 or any other existing or future standards/specification document for example.

Figure 3:
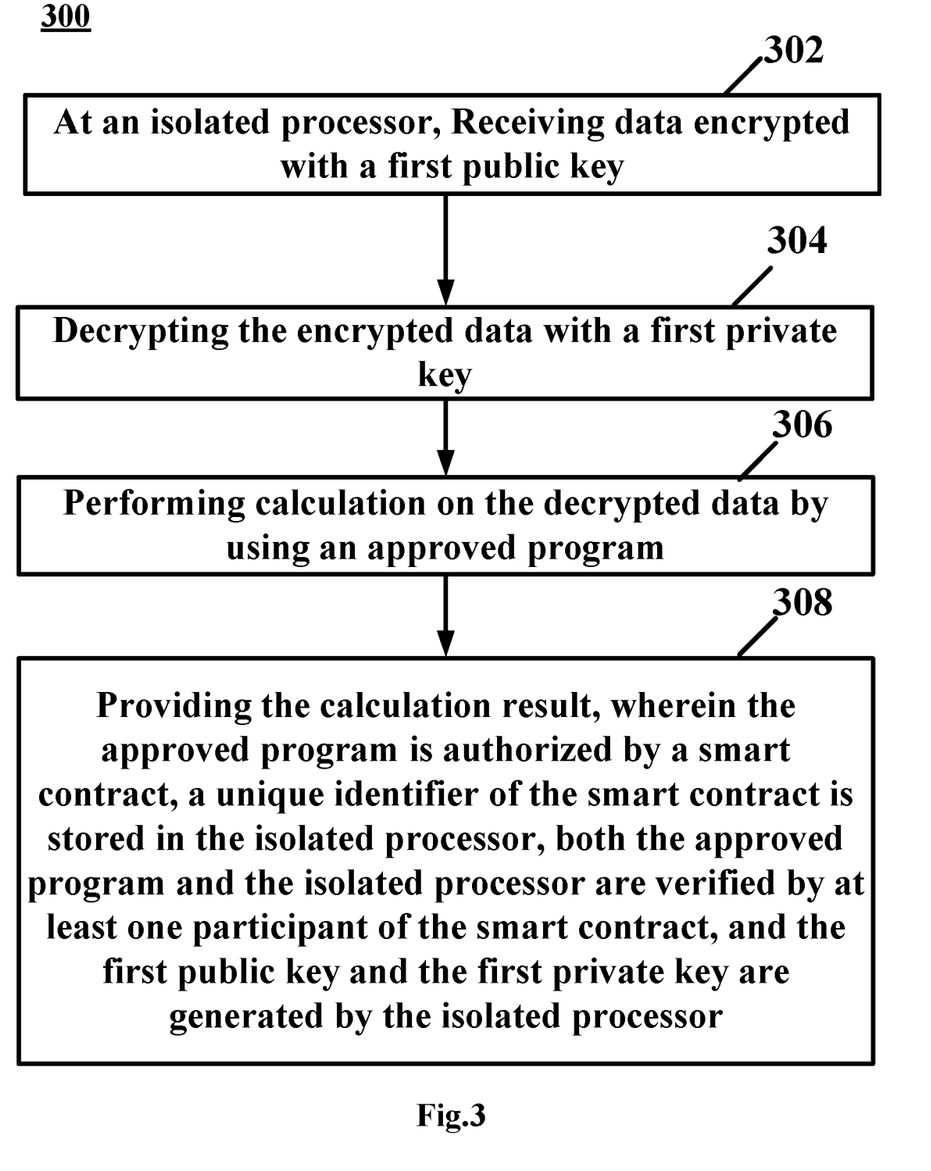
FIG. 3 illustrates a flow chart of a process for trusted computing according to an embodiment of the present disclosure.

FIG. 3 illustrates a flow chart of a process 300 for trusted computing according to an embodiment of the present disclosure. The process 300 can be performed by the isolated processor 200 as shown in FIG. 2. For some aspects which has been described above with some embodiments, the description of these aspects is omitted here for brevity.

As shown in the FIG. 3, the process 300 starts at block 302 where the isolated processor 200 may receive data encrypted with a first public key.

At block 304, the isolated processor 200 may decrypt the encrypted data with a first private key.

At block 306, the isolated processor 200 may perform calculation on the decrypted data by using an approved program At block 308, the isolated processor 200 may provide the calculation result. wherein the approved program is authorized by a smart contract, a unique identifier of the smart contract is stored in the isolated processor, both the approved program and the isolated processor are verified by at least one participant of the smart contract, and the first public key and the first private key are generated by the isolated processor.

In an embodiment, the isolated processor further comprises an unchangeable ROM or one time programmable memory.

In an embodiment, the unique identifier is stored in the unchangeable ROM or one time programmable memory.

In an embodiment, the isolated processor is identified by a second public key and a second private key associated with the second public key is stored in the isolated processor.

In an embodiment, the smart contract contains the second public key, location information of the approved program and a hash value of the approved program or the approved program and the second public key.

In an embodiment, the smart contract contains the second public key and location information of the approved program, and a hash value of the approved program or the approved program and the second public key and its mapping relationship with the unique identifier are stored in the isolated processor.

In an embodiment, the process 300 further comprises authenticating the approved program by the hash value.

In an embodiment, the approved program and at least some contents of the smart contract are made public. For example, the users can check the approved program and at least some contents of the smart contract before they provide data to the isolated processor.

In an embodiment, the unique identifier of the smart contract is produced by a blockchain platform and the method further comprises locating the smart contract in the blockchain platform.

In an embodiment, the participants of the smart contract form an alliance, record types including at least one of the alliance record, the alliance member record, the isolated processor record and the approved program record, are stored onto the blockchain platform's distributed ledger and are queried and managed by the smart contract.

In an embodiment, the calculation is differential privacy computing.

In an embodiment, the isolated processor is fabricated, or immutably programmed, to allow the functionality of monitoring but not tampering with the code that it runs.

The embodiments of the present disclosure can provide the following advantage: no matter where the isolated processor is physically located, it will connect to the internet and it will only be able to execute a program that was agreed by the whole alliance. The blockchain provides a novel way to set in stone an agreement between competing parties without any of them acting as a central authority.

Additionally, an aspect of the disclosure can make use of software running on a isolated processor comprising a trusted execution environment and an isolated storage. Such an implementation might employ, for example, the trusted execution environment, the isolated storage, and an input/output interface.

Accordingly, computer software including instructions or code for performing the methodologies of the disclosure, as described herein, may be stored in the isolated storage and, when ready to be utilized, loaded in part or in whole and implemented by the trusted execution environment. Such software could include, but is not limited to, firmware, resident software, microcode, and the like.

As noted, aspects of the disclosure may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the disclosure may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server.

The flowchart and block diagrams in the figures illustrate the architecture, functionality, and operation of possible implementations of systems, methods and computer program products according to various embodiments of the disclosure. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. It will be further understood that the terms "comprises", "containing" and/or "comprising," when used in this specification, specify the presence of stated features, integers, steps, operations, elements, and/or components, but do not preclude the presence or addition of another feature, integer, step, operation, element, component, and/or group thereof.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

The invention claimed is:

1. A method at an isolated processor comprising a trusted execution environment and an isolated storage,
receiving encrypted data that is encrypted with a first public key;
decrypting the encrypted data with a first private key;
performing calculation on the decrypted data by using an approved program; and
providing a calculation result,
wherein the approved program is authorized by a smart contract, a unique identifier of the smart contract is stored in the isolated processor, both the approved program and the isolated processor are verified by at least one participant of the smart contract, and the first public key and the first private key are generated by the isolated processor.

2. The method of claim 1, wherein the isolated processor further comprises an unchangeable one time programmable memory or read only memory.

3. The method of claim 2, wherein the unique identifier is stored in the unchangeable one time programmable memory or read only memory.

4. The method of claim 1, wherein the isolated processor is identified by a second public key and a second private key associated with the second public key is stored in the isolated processor.

5. The method of claim 4, wherein the smart contract contains the second public key, location information of the approved program and a hash value of the approved program or the approved program and the second public key.

6. The method of claim 5, further comprising authenticating the approved program by the hash value.

7. The method of claim 4, wherein the smart contract contains the second public key and location information of the approved program, and a hash value of the approved program or the approved program and the second public key and its mapping relationship with the unique identifier are stored in the isolated processor.

8. The method of claim 1, wherein the unique identifier of the smart contract is produced by a blockchain platform and the method further comprises locating the smart contract in the blockchain platform.

9. The method of claim 8, wherein the participants of the smart contract form an alliance, and record types, including at least one of an alliance record, an alliance member record, an isolated processor record and an approved program record, are stored onto the blockchain platform's distributed ledger and are queried and managed by the smart contract.

10. An isolated processor comprising:
a trusted execution environment and an isolated storage including computer program code, the isolated storage and the computer program code configured to, with the trusted execution environment, cause the isolated processor at least to perform:
receiving encrypted data that is encrypted with a first public key;
decrypting the encrypted data with a first private key;
performing calculation on the decrypted data by using an approved program; and
providing a calculation result,
wherein the approved program is authorized by a smart contract, a unique identifier of the smart contract is stored in the isolated processor, both the approved program and the isolated processor are verified by at least one participant of the smart contract, and the first public key and the first private key are generated by the isolated processor.

11. The isolated processor of claim 10, wherein the isolated processor further comprises an unchangeable one time programmable memory or read only memory.

12. The isolated processor of claim 11, wherein the unique identifier is stored in the unchangeable one time programmable memory or read only memory.

13. The isolated processor of claim 10, wherein the isolated processor is identified by a second public key and a second private key associated with the second public key is stored in the isolated processor.

14. The isolated processor of claim 13, wherein the smart contract contains the second public key, location information of the approved program and a hash value of the approved program or the approved program and the second public key.

15. The isolated processor of claim 14, wherein the isolated processor is further caused to:
authenticate the approved program by the hash value.

16. The isolated processor of claim 13, wherein the smart contract contains the second public key and location information of the approved program, and a hash value of the approved program or the approved program and the second public key and its mapping relationship with the unique identifier are stored in the isolated processor.

17. The isolated processor of claim 13, wherein the approved program and at least some contents of the smart contract are made public.

18. The isolated processor of claim 10, wherein the unique identifier of the smart contract is produced by a blockchain platform and the isolated processor is further caused to locate the smart contract in the blockchain platform.

19. The isolated processor of claim 18, wherein the participants of the smart contract form an alliance, and record types, including at least one of an alliance record, an alliance member record, an isolated processor record, and an approved program record, are stored onto the blockchain platform's distributed ledger and are queried and managed by the smart contract.

20. The isolated processor of claim 10, wherein the isolated processor is fabricated, or immutably programmed, to allow the functionality of monitoring but not tampering with the code that it runs.

* * * * *